(12) United States Patent
Gruber et al.

(10) Patent No.: US 8,167,341 B2
(45) Date of Patent: May 1, 2012

(54) SWING GATE LATCH SYSTEM

(75) Inventors: Herbert Gruber, Rochester Hills, MI (US); Miguel Waldner, Troy, MI (US)

(73) Assignee: Magna International Inc., Aurora (CA)

(*) Notice: Subject to any disclaimer, the term of this patent is extended or adjusted under 35 U.S.C. 154(b) by 1094 days.

(21) Appl. No.: 11/760,298

(22) Filed: Jun. 8, 2007

(65) Prior Publication Data

US 2007/0296226 A1 Dec. 27, 2007

Related U.S. Application Data

(60) Provisional application No. 60/811,954, filed on Jun. 8, 2006.

(51) Int. Cl.
*E05C 3/06* (2006.01)
(52) U.S. Cl. .................. 292/216; 292/201; 292/DIG. 23
(58) Field of Classification Search .................. 292/216, 292/210, DIG. 29, 341.11, 341.12, 341.15, 292/DIG. 42, DIG. 43, 9, 15, 23; 296/50–51, 296/57.1, 146.11, 146.12; 49/192
See application file for complete search history.

(56) References Cited

U.S. PATENT DOCUMENTS

| 364,725 | A | * | 6/1887 | Brown | 246/442 |
| 1,089,193 | A | * | 3/1914 | Ervien | 292/15 |
| 3,647,251 | A | * | 3/1972 | Brown et al. | 292/111 |
| 7,021,678 | B1 | * | 4/2006 | Raoult | 292/63 |
| 7,093,876 | B2 | * | 8/2006 | Romig et al. | 296/50 |
| 7,147,257 | B2 | * | 12/2006 | Johansen et al. | 292/341.15 |

* cited by examiner

*Primary Examiner* — Kristina Fulton
(74) *Attorney, Agent, or Firm* — Warn Partners, P.C.

(57) ABSTRACT

In one embodiment, the present invention is a latch device having a latch and a base portion, where the latch is selectively connected to the base portion, and pivotable about the base portion along a first axis. The present invention also includes a cam mechanism for securing the latch such that the latch is secured for rotation and support of a door for a vehicle along a second axis when the door is rotated about a first axis but allows free movement of the latch when the door is actuated for rotation about a second axis.

19 Claims, 4 Drawing Sheets

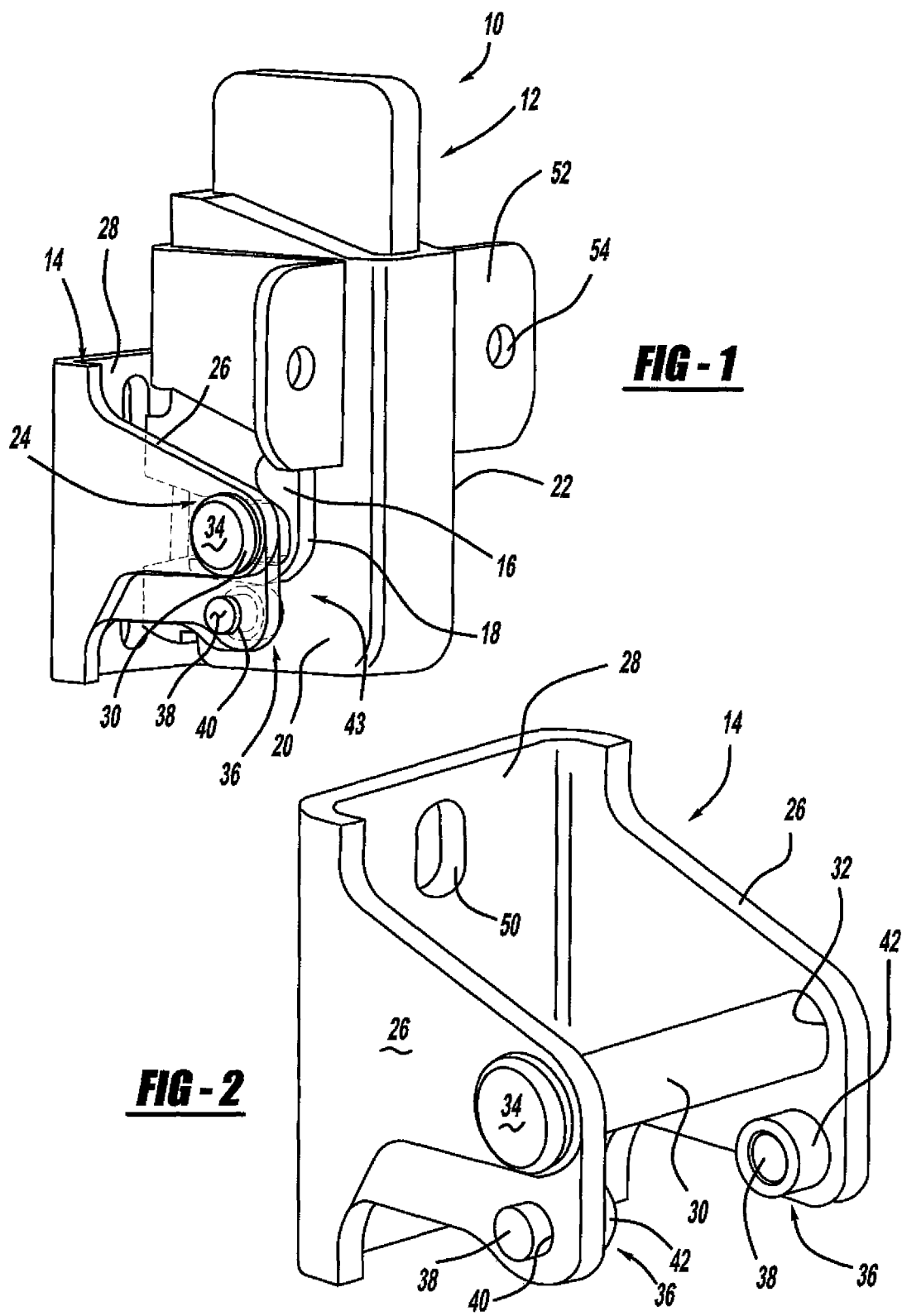

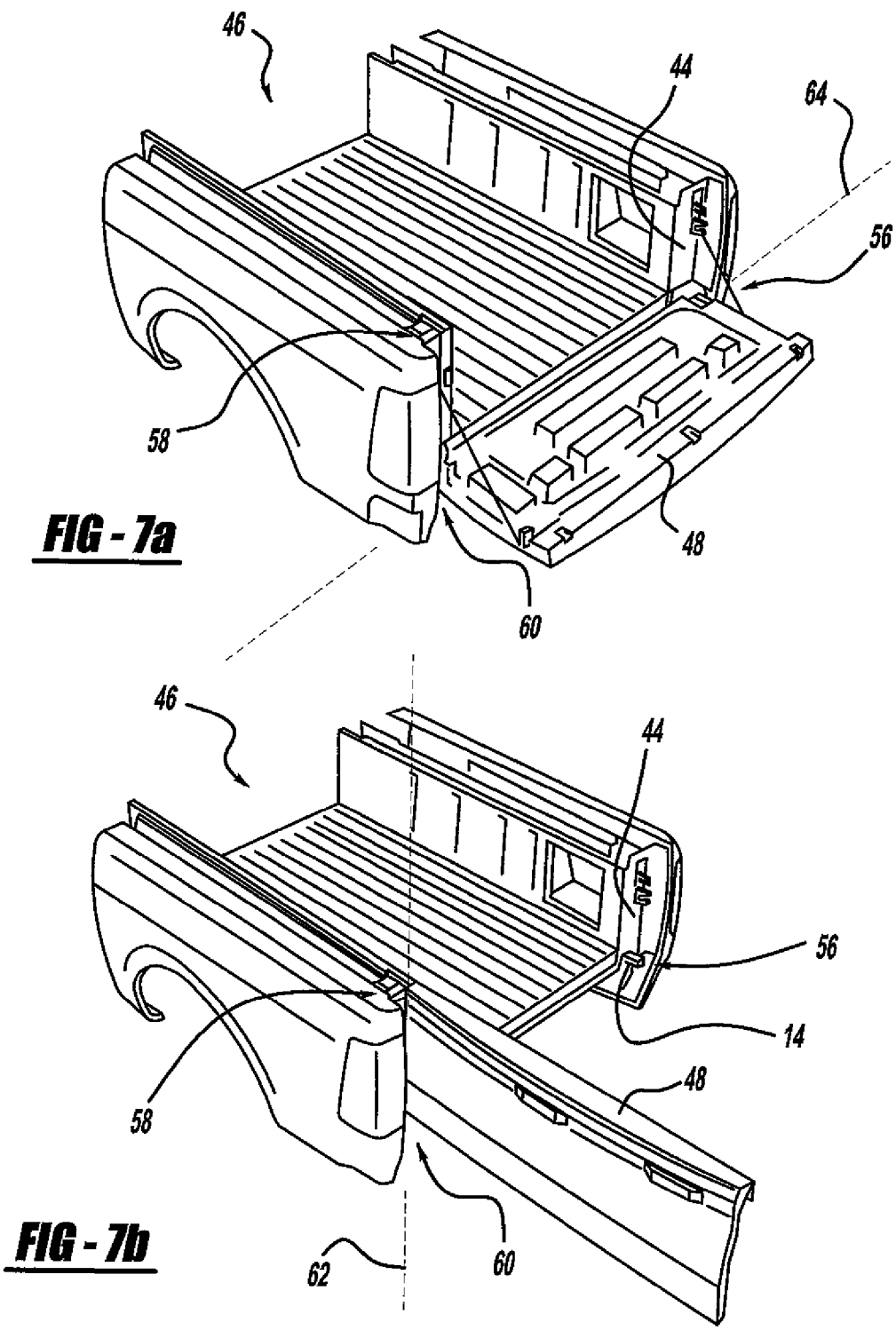

SWING GATE LATCH SYSTEM

CROSS-REFERENCE TO RELATED APPLICATION

This application claims the benefit of U.S. Provisional Application No. 60/811,954 filed on Jun. 8, 2006, entitled "Geometrical Locking System for Swing Gate Latches" which is incorporated herein by reference for all purposes

FIELD OF THE INVENTION

The present invention relates to a latching device for a vehicle door. More particularly, the present invention relates to a latching device which is used as a hinge along a first axis, but allowing free movement when rotating the door between a first position and a second position along a second axis.

BACKGROUND OF THE INVENTION

Vehicles today typically have devices such as doors, hatches, or tailgates that open in a single direction. However, in some vehicles these devices are capable of opening in multiple directions. In regard to tailgates, it has become increasingly common to construct a tailgate having the ability to open in more than one direction, such as a drop down mode seen on many pickup trucks, as well as a swing open mode where the tailgate can pivot about two hinges located on one side of the tailgate. These multiple directional doors or tailgates typically require complex hinge systems which allow the door or tailgate to move in multiple directions. Certain hinges must be capable of performing a pivoting function, while at the same time having the ability to detach a portion of the tailgate from the vehicle. These complex hinge systems can be time consuming to install and manufacture.

Therefore, it is desirable to develop a less complex latch device that is capable of allowing a vehicle door or tailgate to pivot in multiple directions.

SUMMARY OF THE INVENTION

In one embodiment, the present invention is a latch device having a latch and a base portion, where the latch is selectively connected to the base portion, and pivotable about the base portion between a first position, a second position, and any position therebetween. The present invention also includes a cam mechanism for securing the latch such that the latch is secured for rotation when the door is rotated about a first axis but allows free movement of the latch when the door is actuated for rotation about a second axis. The door is supported by the cam mechanism when in the open position so that the door will not drop down or disengage to the side.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a perspective view of a latch device in a first position, in accordance with the present invention;

FIG. 2 is a perspective view of a base portion used in a latch device, in accordance with the present invention;

FIG. 7a is a perspective view of a tailgate used in a drop down mode of operation, in accordance with the present invention; and FIG. 7b is a perspective view of a tailgate used in a swing open mode of operation, in accordance with the present invention.

DETAILED DESCRIPTION OF THE PREFERRED EMBODIMENTS

Figure 3:
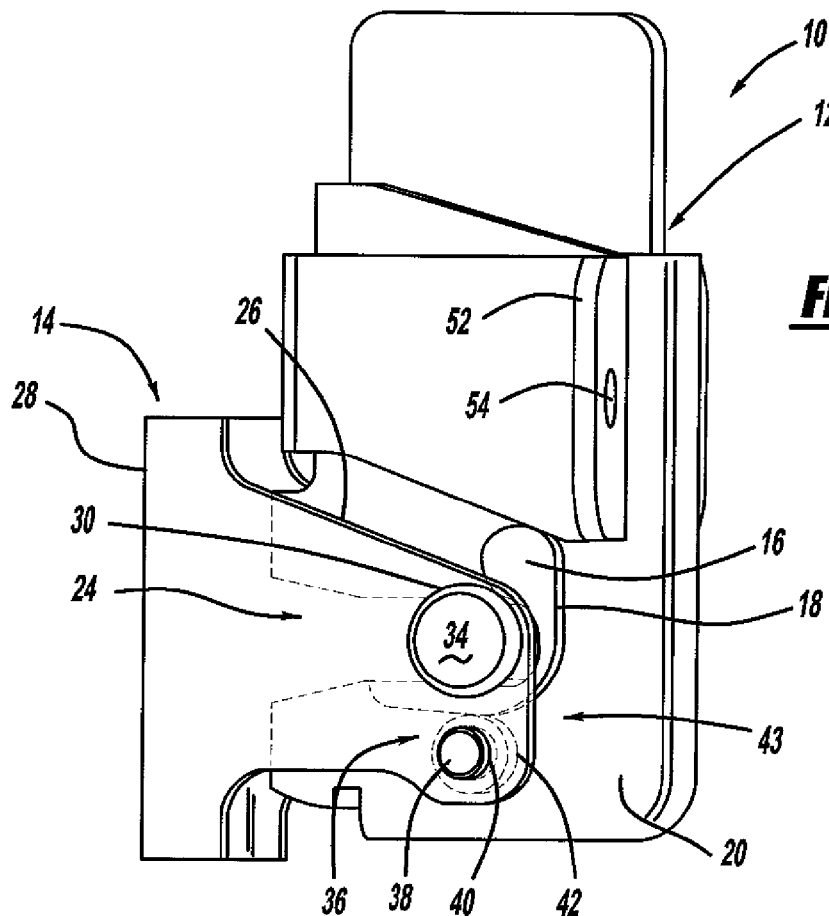
FIG. 3 is a second perspective view of a latch device in a first position, in accordance with the present invention.

The following description of the preferred embodiment(s) is merely exemplary in nature and is in no way intended to limit the invention, its application, or uses.

Referring to FIGS. 1-6, a latch device is generally shown at 10. The latch device 10 has a latch, generally indicated at 12, and a base portion, or striker, generally indicated at 14. Preferably, the latch 12 and striker 14 are operably connected to one another so that the latch 12 acts similar to a hinge during at least a portion of the operation of the latch device 10, and moves with respect to the striker 14, as described below.

In a preferred embodiment, the latch 12 has at least one cam or rail 16. Each cam or rail 16 also includes at least one cam surface 18. The cam 16 is defined by an opening in at least one side of the latch 12. Preferably there are two latch slides 16 on opposite sides 20, 22 of the latch 12, where the shape of the latch slides 16 are aligned with a slot, generally shown at 24, formed in the latch 12. It should be appreciated that additional predetermined features can be included in the latch 12 which, for example but not limited to, effect the movement of the latch 12 with respect to the striker 14.

In a preferred embodiment, the striker 14 has two extensions 26 that extend from a base 28. Thus, the extensions 26 define a hollow interior in the striker 14. A striker pin 30 extends between the extensions 26, and is partially disposed within an aperture 32 formed in each of the extension 26. On each end of the striker pin 30 is a cap 34, which holds the striker pin 30 in place. The striker 14 also has at least one striker roller, generally shown at 36. Preferably, the striker 14 has two striker rollers 36 that extend from the extensions 26, substantially perpendicular to the extensions 26 and are aligned with the striker pin 30. Thus, the striker rollers 36 extend towards, and are aligned with, one another. The striker rollers 36 each have a pin 38 partially disposed in an aperture 40, and a cam follower, which in this embodiment is a bushing 42 that is in contact with the cam surface 18 of each cam 16. The cam follower 42 could also be a bearing, or the like. The cam 16 and cam follower 36 form a cam mechanism, generally shown at 43.

The striker 14 is attached or imbedded into a vehicle body, which in this embodiment the striker 14 is attached to a pillar 44 of a bed of a pickup truck, shown generally at 46. The latch 12 is attached or imbedded into a vehicle door, hatch, or, as in this embodiment, a tailgate 48. The striker 14 can be attached to the pillar 44 by the use of a fastener, such as a screw, bolt, weld, rivet, or the like, inserted through an aperture 50 in the striker 14, or by methods such as brazing or welding. The latch 12 can be attached to the tailgate 48 through the use of a flange 52 having apertures 54. Again, a fastener such as a screw, bolt, weld, rivet, or the like, could be inserted through the apertures 54, or the flange could be attached to the tailgate 48 by methods such as brazing or welding. Thus, the latch device 10 is located at a position relative to the tailgate 48 and bed 46 to allow the tailgate 48 to pivot when the tailgate 48 is opened in one direction, and to allow a portion of the tailgate 48 to detach from the bed 46 when the tailgate 48 is opened in a second direction.

Additionally, more than one latch device 10 can be used with a tailgate 48. For example, in a preferred embodiment, one latch device 10 is located at a first location 56, and another latch device 10 is diagonally located in a second location 58 for facilitating illustrated opening of the tailgate 48 in various directions. The latch device 10 located in the first location 56 is oriented differently relative to the latch device 10 located in the second location 58 such as to facilitate the tailgate 48 being allowed to pivot in more than one direction. Additionally, a universal hinge (not shown) is provided at a third location 60, and is used for also facilitating the tailgate 48 being allowed to pivot in more than one direction. Thus the latch device 10 at second location 58 is positioned to effect rotation along a first axis 62, and release when the tailgate 48 is rotated along a second axis 64 in conjunction with the universal hinge a the third location 60. Whereas latch device 10 at the first location 56 provides release when the door is rotated along the first axis 62, and provides for rotation when the tailgate 48 is rotated along the second axis 64.

Also included in the latch device 10 is a rotating member (not shown) which is used for receiving the striker pin 30 when the latch device 10 is in the position shown in FIGS. 1 and 3. The rotating member rotates includes a recess which receives the striker pin 30. This locks the striker pin 30 for securing the tailgate 48 and can be unlatched for allowing the latch device 10 to operate as described herein. A rotating member and a universal hinge used with the present invention are set forth in U.S. application Ser. No. 11/784,891, the entire disclosure of which is incorporated herein by reference.

The latch devices 10 positioned as set forth above are suited for allowing a tailgate 48 to operate in a "drop down" mode, or a "swing open" mode. An example of a tailgate 48 operating in drop down mode is shown in FIG. 7a, and an example of a tailgate 48 opening in swing open mode is shown in FIG. 7b. When the tailgate 48 is closed, the latch device 10 is in a first position, as shown in FIG. 1. When it is desired to operate the tailgate 48 in the swing open mode, the tailgate 48 will pivot about the first axis 62 on the opposite side of the latch device 10, and the striker pin 28 will slide out of the slot 24, releasing a portion of the tailgate 48 from the striker 14. When the latch device 10 is being used in the swing open mode, the tailgate 48 pivots about the first axis 62 which is vertical in relation to the vehicle; thus, the tailgate 48 can swing open. As this occurs, the striker pin 30 slides out of the slot 24. Similarly, when the tailgate 48 is swung closed, the latch 12 and striker 14 come into contact with one another by the striker pin 30 re-entering the cam 16 through the slot 24. A liftgate latch mechanism (not shown) is used for allowing one of the cables connected to the tailgate 48 to be released from the bed 46 when the tailgate 48 is being used in the swing open mode of operation. A suitable liftgate latch mechanism for use in the present invention is disclosed in U.S. application Ser. No. 11/696,903, the entire disclosure of which is herein incorporated by reference.

Figure 4:
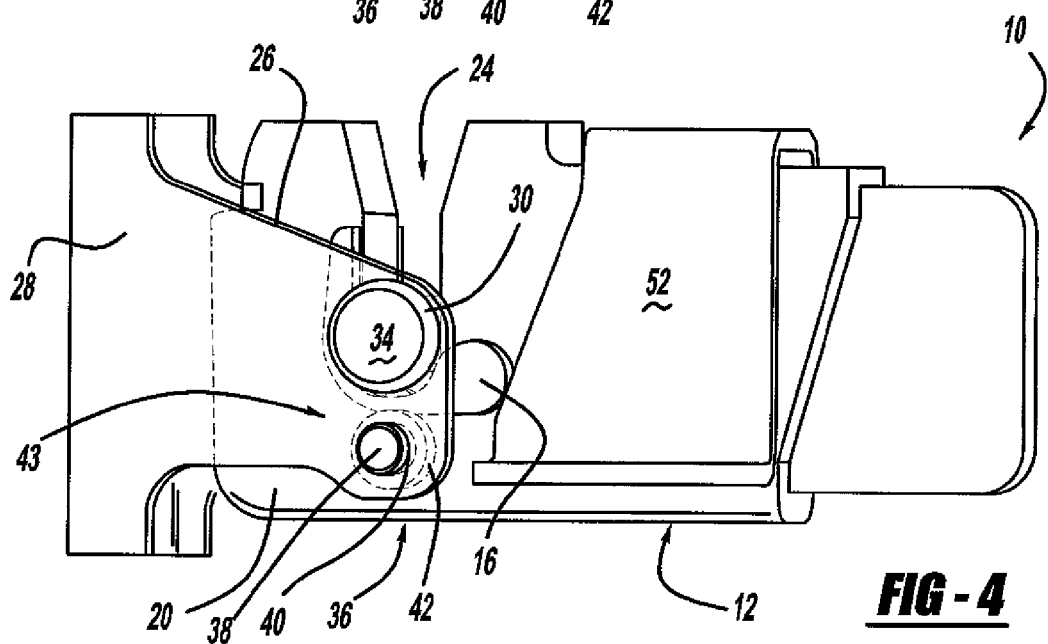
FIG. 4 is a perspective view of a latch device in a second position, in accordance with the present invention.
Figure 5:
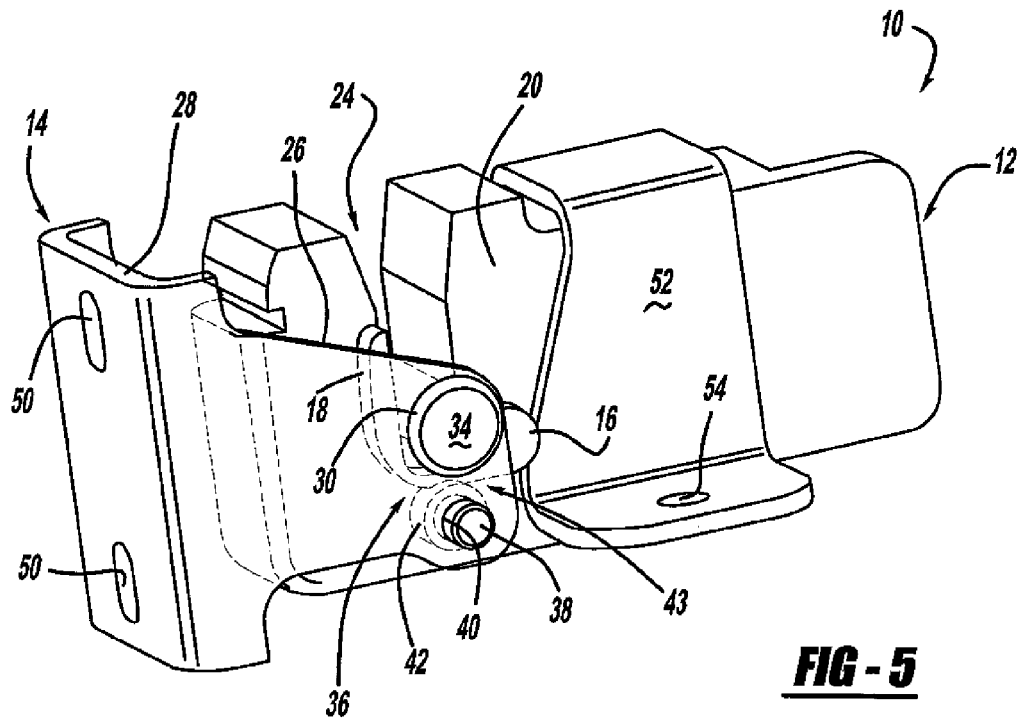
FIG. 5 is a second perspective view of a latch device in a second position, in accordance with the present invention.
Figure 6:
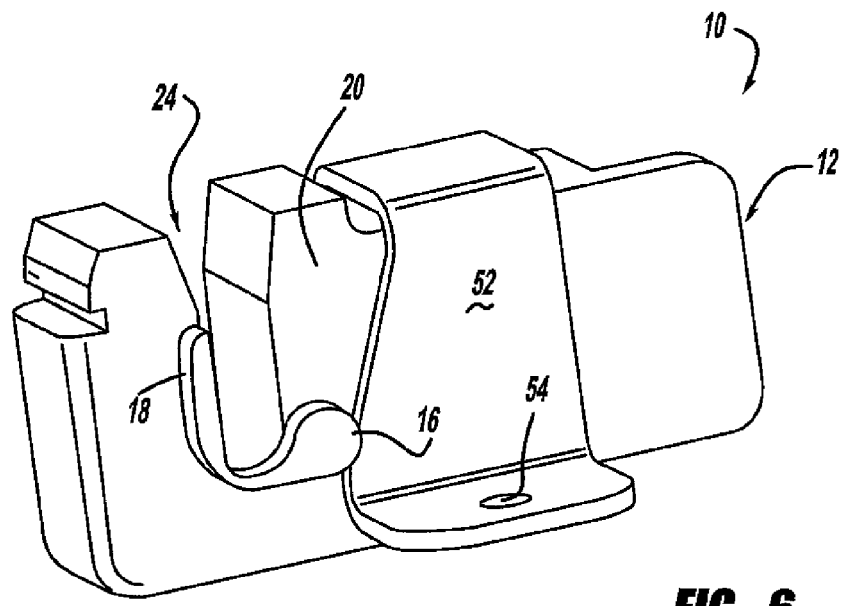
FIG. 6 is a perspective view of a latch used in a latch device, in accordance with the present invention.

When the tailgate 48 is used in the drop down mode, the latch 12 is initially in the first position (FIG. 1), and moves through a range of motion to a second drop down position, as shown in FIGS. 4 and 5, and the tailgate 48 will be in the position shown in FIG. 7a. In this mode of operation, the striker pin 30 is located in the slot 24 and rests against the end of the slot 24. When the tailgate 48 opens in the drop down mode, the tailgate 48 will pivot about the striker pin 30, and the tailgate 48 shown in FIG. 7a will rotate about the second axis 64. As the tailgate 48 pivots, the bushing 42 of the striker roller 32 will translate along the cam surface 18. As the tailgate 48 and the latch 12 pivot about the striker pin 30, the cam 16 is located between the striker pin 30 and the bushing 38. The shape of the cam surface 18 dictates how the latch 12 pivots about the striker pin 30.

When the latch 12 is in the drop down position, the latch 12 is in the position shown in FIGS. 4 and 5. The latch 12 is not allowed to separate from the striker 14 due to the latch slides 16. If the latch slides 16 were not used, the latch 12 would become disconnected from the striker 14 because the striker pin 30 would slide out of the slot 24; gravity would cause the latch 12 and the tailgate 48 connected to the latch 12 to fall in a downward direction when looking at FIGS. 4 and 5. The latch slides 16 maintain a pivoting connection between the latch 12 and the striker 14. When the latch 12 is in the position shown in FIGS. 4 and 5, the latch slides 16 are located between the bushing 42 and the striker pin 30, keeping the latch 12 connected to the striker 14. Even if the rotating members used in the latch devices 10 in both the first location 56 and the second location 58 are released, the latch slides 16 and the striker rollers 36 will maintain the rotation of the tailgate 48 about the striker pin 30, regardless of whether the tailgate is being used in drop down mode or swing open mode.

When the tailgate 48 is being closed from the drop down position, the latch 12 moves with respect to the striker 14 due to the striker pin 30 extending through the cam 16. When the tailgate 48 is in the closed position the engagement of the tailgate 48 with the pillar 44 of the bed 46 restricts the striker pin 30 from disengaging the slot 24.

When the latch 12 is pivoting and is connected to the striker 14, the striker rollers 36 allow or assist the surfaces of the latch 12 to move about the striker 14. Thus, when the striker rollers 36 are not used then the friction between the surfaces of the latch 12 and striker box 14 can prevent or increase the difficulty for the latch 12 to move with respect to the striker box 14, when compared to when the striker rollers 36 are used.

While the subject invention is illustrated as a tailgate 48, it should be appreciated that the invention can be used on lift gates for SUV's, access door panel boards, trunks, or other vehicle panels where opening along more than one axis is desirable.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle door latch device comprising:
a vehicle door;
a latch connected to said vehicle door;
a base portion, said latch is selectively connected to said base portion, such that when said latch is connected to said base portion, said latch is pivotable about said base portion between a first position, a second position, and any position therebetween;
a striker pin connected to said base portion, said striker pin selectively received by said latch such that when said striker pin is received by said latch, said latch pivots about said striker pin as said latch moves between said first position and said second position;
a cam mechanism which secures said latch such that said latch is secured for rotation and support of said door when said door is rotated about a first axis but allows free movement of said latch when said door is actuated for rotation about a second axis, and said first axis is perpendicular to said second axis;
at least one cam having at least one cam surface, said at least one cam connected to said latch such that said at least one cam partially surrounds said striker pin when said striker pin is received by said latch, and said at least one cam being part of said cam mechanism; and at least one cam follower in contact with said at least one cam surface, said at least one cam follower being part of said cam mechanism;

wherein said at least one cam is positioned between said at least one cam follower and said striker pin as said latch moves between said first position and said second position, and said at least one cam follower translates along said at least one cam surface.

2. The vehicle door latch device of claim 1, said base portion further comprising:
   a base;
   at least one extension connected to said base and said striker pin operably connected to said at least one extension, said at least one extension having an aperture; and
   a striker roller partially received in said aperture on said at least one extension, said at least one cam follower being part of said striker roller, wherein said striker roller guides said latch as said latch moves between said first position and said second position, and said striker roller restricts said latch from becoming detached from said base after said latch is no longer in said first position.

3. The vehicle door latch device of claim 2, said striker roller further comprising a pin partially disposed within said aperture formed on said at least one extension, said cam follower is disposed about a portion of said pin, wherein said cam follower guides the rotation of said latch as said latch changes between said first position to said second position.

4. The vehicle door latch device of claim 1, said latch further comprising a slot formed for receiving a portion of said striker pin.

5. The vehicle door latch device of claim 1, wherein said latch is connected to the tailgate of an automobile, and said base portion is connected to said automobile.

6. The vehicle door latch device of claim 1, said latch device further comprising a plurality of vehicle door latches connected to said door, and a vehicle, wherein at least one of said plurality of vehicle door latches facilitates said door pivoting about said first axis, and at least one of said plurality of vehicle door latches facilitates said door pivoting about said second axis.

7. The vehicle door latch device of claim 1, further comprising a universal hinge, wherein said universal hinge facilitates said vehicle door pivoting about said first axis and said second axis.

8. A latch device for a vehicle, comprising:
   a base portion having a base and at least one extension extending from said base;
   at least one striker roller connected to said at least one extension;
   at least one striker pin connected to said at least one extension;
   a vehicle door;
   a latch having a slot which selectively receives said at least one striker pin, said latch connected to said vehicle door;
   a cam mechanism which secures said latch such that said latch is secured for rotation and support of said door when said door is rotated about a first axis but allows free movement of said latch when said door is actuated for rotation about a second axis, and said first axis is perpendicular to said second axis; and
   at least one cam connected to said latch such that said at least one cam is disposed between said at least one striker pin and said at least one striker roller when said striker pin is received into said latch, and said at least one cam surrounds at least a portion of said striker pin when said latch is connected to said base, said at least one cam being part of said cam mechanism;
   wherein said latch is operable to be disconnected from said base, and when said latch is connected to said base, said latch is moveable and supported for rotation between a first position and a second position and said striker pin is located in said slot.

9. The latch device for a vehicle of claim 8, said base portion further comprising:
   an aperture formed in said at least one extension, wherein said striker roller is mounted in said aperture.

10. The latch device for a vehicle of claim 9, said striker roller further comprising:
    a pin partially disposed in said aperture; and
    at least one cam follower mounted on said pin, wherein as said latch moves from said first position to said second position, said at least one cam follower translates along said at least one cam.

11. The latch device for a vehicle of claim 10, said at least one cam further comprising a cam surface, wherein as said latch moves between said first position and said second position, said at least one cam follower translates along said at least one cam surface.

12. The latch device for a vehicle of claim 8, further comprising said striker pin to be disposed within said slot when said latch is connected to said base portion.

13. The latch device for a vehicle of claim 8, wherein said latch pivots about said striker as said latch is moved from said first position to said second position.

14. The latch device for a vehicle of claim 8, said latch wherein as said latch becomes disconnected from said base, said striker pin slides out of said slot.

15. A latch device for a vehicle, comprising:
   a striker having a base, at least one extension extending from said base;
   at least one aperture formed in said at least one extension;
   a striker roller mounted in said at least one aperture;
   a striker pin connected to said at least one extension;
   a tailgate;
   a latch connected to said tailgate;
   a cam mechanism which secures said latch such that said latch is secured for rotation and support of said tailgate when said tailgate is rotated about a first axis but allows free movement of said latch when said tailgate is actuated for rotation about a second axis, and said first axis is perpendicular to said second axis;
   at least one cam connected to said latch, said at least one cam being part of said cam mechanism;
   a slot formed in at least a portion of said latch such that a portion of said slot is aligned with a portion of said at least one cam, said latch being operable for movement between a first position and a second position when connected to said striker, and being operable to be selectively disconnected from said striker, and when said latch is connected to said striker, said striker pin is disposed within said slot such that said at least one cam partially surrounds said striker pin, said at least one cam is disposed between said striker roller and said striker pin such that said at least one cam moves between said striker roller and said striker pin as said latch moves between said first position and said second position, and said latch pivots about said striker pin in said slot, and is supported by said striker roller and said cam, as said latch changes between said first position to said second position.

16. The latch device for a vehicle of claim 15, wherein said striker roller is in contact with said at least one cam as said latch moves between said first position and said second position.

17. The latch device for a vehicle of claim 15, said striker roller further comprising:
    a pin partially disposed within said slot; and a cam follower disposed on a portion of said pin, wherein as said latch changes between said first position and said second position, said cam follower moves along said at least one cam.

18. The latch device for a vehicle of claim 17, said at least one cam further comprising a cam surface, and said cam follower translates along said cam surface as said latch moves between said first position and said second position.

19. The latch device for a vehicle of claim 15, wherein said striker pin is removed from said slot when said latch is disconnected from said striker.

* * * * *